US011502946B2

(12) United States Patent
Wang et al.

(10) Patent No.: US 11,502,946 B2
(45) Date of Patent: Nov. 15, 2022

(54) DISTRIBUTED LABEL ASSIGNMENT FOR LABELED ROUTING PROTOCOL ROUTES

(71) Applicant: Juniper Networks, Inc., Sunnyvale, CA (US)

(72) Inventors: Kevin Wang, Acton, MA (US); Jaihari V. Loganathan, Cupertino, CA (US); Jeffrey Haas, Ypsilanti, MI (US); Sanjay Khanna, Cary, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 214 days.

(21) Appl. No.: 16/814,664

(22) Filed: Mar. 10, 2020

(65) Prior Publication Data

US 2021/0288906 A1  Sep. 16, 2021

(51) Int. Cl.
*H04L 45/50* (2022.01)
*H04L 45/00* (2022.01)
*H04L 45/24* (2022.01)
*H04L 45/42* (2022.01)
*H04L 45/586* (2022.01)
*H04L 47/78* (2022.01)

(52) U.S. Cl.
CPC ............. *H04L 45/50* (2013.01); *H04L 45/22* (2013.01); *H04L 45/24* (2013.01); *H04L 45/42* (2013.01); *H04L 45/586* (2013.01); *H04L 47/781* (2013.01)

(58) Field of Classification Search
CPC ......... H04L 45/50; H04L 45/22; H04L 45/24; H04L 45/42; H04L 45/586; H04L 47/781; H04L 45/507; H04L 12/4641; H04L 45/04; H04L 45/14
See application file for complete search history.

(56) References Cited

U.S. PATENT DOCUMENTS 7,184,437 B1    2/2007  Cole et al.
7,245,619 B1    7/2007  Guan et al.
          (Continued)

FOREIGN PATENT DOCUMENTS

CN      1848792 A       10/2006
CN    101572669 A       11/2009
          (Continued)

OTHER PUBLICATIONS

Extended Search Report from counterpart European Application No. 20177676.2, dated Oct. 20, 2020, 10 pp.
Lei et al., "An Improved Parallel Access Technology on Routing Table for Threaded BGP," 2009, 15th International Conference on Parallel and Distributed Systems, Dec. 1, 2009, 7 pp.
          (Continued)

*Primary Examiner* — Kibrom T Hailu
(74) *Attorney, Agent, or Firm* — Shumaker & Sieffert, P.A.

(57) ABSTRACT

In general, various aspects of the techniques are described in this disclosure for distributed label assignment for labeled routes. In one example, a method includes obtaining, by a first thread of a plurality of execution threads for at least one routing protocol process executing on processing circuitry of a network device, an allocation of first labels drawn from a label space for a network service; adding, by the first thread, the first labels to a first local label pool for the first thread; generating, by the first thread, after obtaining the allocation of the first labels, a labeled route comprising a route for the network service and a label assigned by the first thread from the first local label pool; and outputting, by the network device, the labeled route.

20 Claims, 5 Drawing Sheets

(56) References Cited

U.S. PATENT DOCUMENTS

| | | | |
|---|---|---|---|
| 8,937,961 | B1 | 1/2015 | Vairavakkalai |
| 10,455,449 | B1 * | 10/2019 | Sanghavi ............... H04W 28/08 |
| 10,642,650 | B2 | 5/2020 | Wang et al. |
| 2003/0110289 | A1 | 6/2003 | Kamboh et al. |
| 2004/0160969 | A1 | 8/2004 | Moon et al. |
| 2005/0135256 | A1 | 6/2005 | Ball et al. |
| 2005/0169281 | A1 | 8/2005 | Ko et al. |
| 2005/0198375 | A1 * | 9/2005 | Hwang ................ H04L 45/507 709/238 |
| 2011/0242991 | A1 | 10/2011 | Zhang et al. |
| 2015/0103844 | A1 | 4/2015 | Zhao et al. |
| 2016/0352619 | A1 | 12/2016 | Gattani |
| 2017/0012895 | A1 | 1/2017 | Zhao et al. |

FOREIGN PATENT DOCUMENTS

| | | |
|---|---|---|
| CN | 101741705 A | 6/2010 |
| CN | 102394809 A | 3/2012 |
| CN | 102752198 A | 10/2012 |
| CN | 105812276 A | 7/2016 |
| CN | 106034075 A | 10/2016 |
| CN | 107343302 A | 11/2017 |
| CN | 109921990 A | 6/2019 |
| EP | 2658184 A1 | 10/2013 |
| WO | 2012083704 A1 | 6/2012 |
| WO | 2012083704 A1 | 7/2013 |

OTHER PUBLICATIONS

Liu et al., "MR-PBGP: A Multi-Root Tree Model for Parallel BGP," 2012 IEEE 14th International Conference on High Performance Computing and Communications, Jun. 25, 2012, 8 pp.

Brands et al., "Parallelization of BGP for route server functionality—A protocol and implementation study," amsix Amsterdam Internet Exchange, MSc Research Project System and Network Engineering, Aug. 4, 2017, 51 pp.

Ishida, "GoBGP: yet another OSS BGPd," NTT Software Innovation Center, RIPE-71, retrieved from https://ripe71.ripe.net/presentations/135-RIPE71_GoBGP.pdf, Nov. 2015, 26 pp.

Rosen et al., "BGP/MPLS IP Virtual Private Networks (VPNs)," Network Working Group, RFC 4364, Feb. 2006, 48 pp.

Response to Extended Search Report dated Oct. 20, 2020, from counterpart European Application No. 20177676.2 filed Mar. 15, 2022, 18 pp.

First Office Action and Search Report, and translation thereof, from counterpart Chinese Application No. 202010485657.7 dated Jul. 5, 2022, 12 pp.

* cited by examiner

DISTRIBUTED LABEL ASSIGNMENT FOR LABELED ROUTING PROTOCOL ROUTES

TECHNICAL FIELD

The disclosure relates to computer networking.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, which in turn may be geographically distributed over a wide area. Each site network may include one or more local area networks (LANs). With the advent of Virtual Private Network (VPN) technology, enterprises can now securely share data between site networks over a public network, such as the Internet. In a typical implementation, one or more "network tunnels" are engineered through a backbone network to transport data and other network communications between the geographically distributed sites.

One form of a VPN is generally referred to as "MPLS VPN" in which Multi-Protocol Label Switching (MPLS) tunnels are used as a transport mechanism. MPLS is a mechanism used to engineer traffic patterns within Internet Protocol (IP) networks. By utilizing MPLS, a source device can request a path through a network to a destination device, i.e., a Label Switched Path (LSP), to carry MPLS packets from the source device to a destination device. Each router along an LSP assigns a label and propagates the label to the closest upstream router along the path for use in forwarding MPLS packets along the path. Routers along the path cooperatively perform MPLS operations to forward the MPLS packets along the established path.

A BGP/MPLS VPN combines the tunneling features of MPLS with virtual routing and forwarding (VRF) and features of border gateway protocol (BGP) to create a VPN. When a VPN is established within a network, devices for the VPN each include VPN-specific VRF tables that are identifiable by a service label known as a VPN route label, which is distinct from transport or infrastructure labels for LSP tunneling. Both service labels and infrastructure labels may be types of MPLS labels. When BGP distributes a VPN route, it also distributes a MPLS label for that route, which for BGP/MPLS VPNs is also known as a VPN route label. Before a data packet for a VPN travels across the backbone, it is encapsulated with the VPN route label that corresponds, in the VPN, to the route that is the best match to the packet's destination address. This labeled packet is further encapsulated (e.g., with another MPLS label or with an IP or Generic Routing Encapsulation (GRE) tunnel header for tunneling across the backbone to the proper PE router). Thus, the backbone core routers do not need to know the VPN routes.

Further details regarding VPNs, specifically VPNs implemented using BGP and MPLS are discussed in E. Rosen and Y. Rekhter, "BGP/MPLS IP Virtual Private Networks (VPNs)," RFC 4364, February 2006, the entire contents of which being incorporated by reference in its entirety. Other network protocols that rely on BGP-advertised labels include BGP Labeled Unicast (BGP-LU), Ethernet VPN (EVPN), and some other forms of Layer 3 VPNs (L3VPNs).

SUMMARY

In general, the disclosure describes techniques performed by a network device for distributed label assignment for labeled routes. A network device may execute multiple threads on one or more processing cores to prepare labeled routes for advertising in route advertisements, such as Border Gateway Protocol (BGP) UPDATE messages. Preparation of a labeled route includes allocating a label from the label space. To accomplish such label allocation, the threads implement a concurrency model in which the performance of the label allocation approaches that of a centralized label allocation.

In one example, labels (e.g., service labels or infrastructure labels) are assigned among the threads such that each thread manages a local label pool that is a unique subset of the labels. That is, none of the labels in the local label pool for a thread overlaps with labels of a local label pool managed by a different thread. Each thread uses its local label pool for label assignments, and labels released by a thread are released to its local label pool. In addition, a thread pre-fetches batches of labels from the global label pool to its local label pool to avoid initial fetching latency and releases batches of labels to the global label pool in accordance with thresholds (or "watermarks") to reduce, and in some cases minimize, inter-thread communications regarding label allocation and release. Each thread may then assign labels from its local label pool to include with routes for advertising, by the network device, labeled routes using a routing protocol, e.g., BGP. Network devices that received labeled routes may subsequently direct network packets labeled with the label to the network device, which the network device uses to identify a service with which to process the network packets. Such services may include MPLS VPNs, such as MPLS/BGP VPNs, BGP-LU services, or EVPNs, for example.

The techniques may provide one or more technical improvements or benefits that provide at least one practical application. In general, slow label allocation can cause delays in generating and outputting route advertisements and attendant deleterious effects to network packet forwarding. Previous attempts to avoid label conflicts among multiple threads rely heavily upon exchanging messages with inter-thread/inter-process communications to avoid label conflicts, often in a request/response mode between worker threads and a central thread responsible for managing label allocation, which is performed on a per-label basis. Because inter-thread messages involve latencies and processor (e.g., CPU) costs, centrally-managed per-label allocation may become very expensive and cause significant performance penalties. In other systems, mutex locks can be used to allocated labels from a central thread.

Threads operating according to techniques described herein implement a concurrency model in which coordination among the threads is relatively infrequent and batch-wise, and each thread has a separate local label pool from which to draw for low-latency label assignment. Moreover, the threads can pre-fetch batches of labels according to the thresholds. This reduces inter-thread messaging and may cause the label assignment failure rate (i.e., a thread being unable to assign a label from its local label pool) to approach zero. The efficiencies may reduce the average overall latency for labeled route generation and advertising by network devices and may result in attendant improvements in network packet forwarding.

In one example, a method includes obtaining, by a first thread of a plurality of execution threads for at least one routing protocol process executing on processing circuitry of a network device, an allocation of first labels drawn from a label space for a network service; adding, by the first thread, the first labels to a first local label pool for the first thread; generating, by the first thread, after obtaining the allocation of the first labels, a labeled route comprising a route for the network service and a label assigned by the first thread from the first local label pool; and outputting, by the network device, the labeled route.

In another example, a network device includes at least one hardware-based processor for executing a first thread of a plurality of execution threads for at least one routing protocol process executing on processing circuitry of the network device, the at least one hardware-based processor configured to: obtain, by the first thread of a plurality of execution threads for at least one routing protocol process executing on processing circuitry of the network device, an allocation of first labels drawn from a label space for a network service; add, by the first thread, the first labels to a first local label pool for the first thread; generate, by the first thread, after obtaining the allocation of the first labels, a labeled route comprising a route for the network service and a label assigned by the first thread from the first local label pool; and output, by the network device, the labeled route In another example, a computer-readable medium comprising instructions for causing one or more programmable processors of a network device to: obtain, by the first thread of a plurality of execution threads for at least one routing protocol process executing on processing circuitry of the network device, an allocation of first labels drawn from a label space for a network service; add, by the first thread, the first labels to a first local label pool for the first thread; generate, by the first thread, after obtaining the allocation of the first labels, a labeled route comprising a route for the network service and a label assigned by the first thread from the first local label pool; and output, by the network device, the labeled route.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
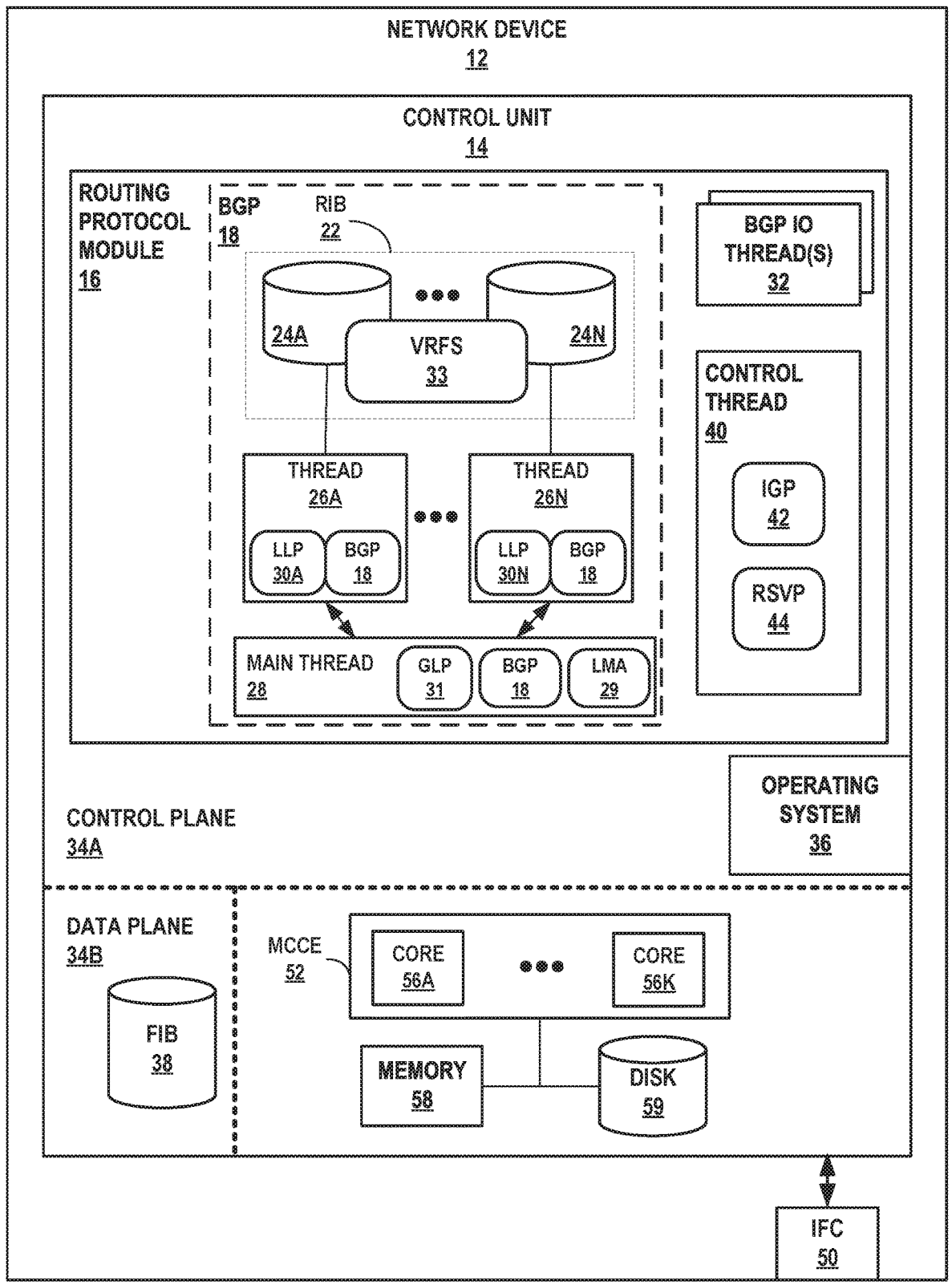
FIG. 1 is a block diagram illustrating an example network device, in accordance with the techniques described in the present disclosure.

FIG. 1 is a block diagram illustrating network device 12 as an example network device, in accordance with the techniques described in the present disclosure. Network device 12 may represent a router, route reflector, or other network device that is connected via one or more network links to other network devices that advertise routes to and receive routes from the network device 12. For example, network device 12 may be a core or edge router of a service provider network, enterprise network, edge network such as a data center network, an access router, a controller, a real or virtual server or other compute node configured to execute a route or route reflector, or a route reflector of any of the aforementioned networks or other network.

Network device 12 includes a multi-core computing environment 52 that includes a plurality of CPU processors or cores 56A-56K (collectively, "cores 56"), where "K" is an integer greater than one. Multi-core computing environment 52 may include any number of processors and any number of hardware cores from, for example, four to thousands. Each of processing cores 56 includes an independent execution unit to perform instructions that conform to an instruction set architecture for the core. Processing cores 56 may each be implemented as separate integrated circuits (ICs) or may be combined within one or more multi-core processors (or "many-core" processors) that are each implemented using a single IC (i.e., a chip multiprocessor), package, or die. Alternatively, or in addition, multi-core computing environment 52 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. As used herein, a "processor" or "processing circuitry" may refer to one or more cores 56. In other examples, network device 12 includes an alternative computing environment that includes a single CPU processor.

Memory 58 represents a main memory. Examples of memory 58 include non-transitory computer-readable mediums including memory such as random-access memory (RAM) (including various forms of dynamic RAM (DRAM), e.g., DDR2 SDRAM and DDR3), or static RAM (SRAM), and Flash memory. Storage disk 59 is a form of fixed or removable storage medium that can be used to carry or store desired program code and program data in the form of instructions or data structures and that can be accessed by a processor, or any other type of volatile or non-volatile memory that stores instructions to cause the one or more cores 56 to perform techniques described herein. Examples of storage device 59 include a disk drive and/or an optical drive.

Multi-core computing environment 52, memory 58, and storage device 59 provide a hardware operating environment for a control unit 14 that performs control plane 34A and, in some cases, forwarding or data plane 34B functionality for network device 12. That is, in this example, control unit 14 is divided into two logical or physical "planes" to include a first control or routing plane 34A ("control plane 34A") and a second data or forwarding plane 34B ("data plane 34B"). That is, control unit 14 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 34A defines control plane functionality of network device 12. Control plane 34A manages and controls the behavior of network 12, including the behavior of data plane 34B. Operating system 36 of control plane 34A provides a run-time environment for multiple different processes each made up of one or more execution threads. Operating system 36 may represent, for example, a UNIX operating system derivative such as Linux or Berkeley Software Distribution (BSD). Operating system 36 may offer libraries and drivers by which processes may interact with data plane 34B, for example, or other hardware of router 30, including a file system and main memory for network device 12. Libraries and drivers of operating system 36 may include Application Programming Interfaces (APIs) that provide standard interfaces for developers to invoke the functionality of operating system 36 and network device 12 exposed by the libraries and drivers. Operating system 36 supports multi-threading for multiple software execution threads. Although described with respect to a network device 12 that includes a data plane 34B for forwarding packets in accordance with routing information including received routes, the techniques of this disclosure are applicable to network devices, such as controllers and route reflectors, that perform control plane 34A operations but may perform limited data plane 34B operations with respect to forwarding packets in accordance with routing information including received routes. In some cases, the control plane 34A and data plane 34B are not co-located within a single network device chassis but are distributed among multiple devices. For example, examples of network device 12 that are controllers may perform the techniques described herein with respect to route processing and program, using software-defined network (SDN) techniques, one or more network nodes with forwarding information to implement the realize the routes within the network.

Network device 12 includes one or more network interface card(s) 50 coupled to control unit 14 via a bus or other communication links. Interface card(s) include one or more ports configured to receive network cables to couple network device 12 to other network devices that advertise routes according to a routing protocol.

Control unit 14 is configured to execute a routing protocol module 16, which represents one or more computer processes for managing routing information of network device 12 by, e.g., executing routing protocols to advertise and receive routes, processing received routes to resolve next hops, and in some cases generating forwarding information. In the example of network device 12, forwarding information for the network device 12 is represented by forwarding information base 38 of data plane 34B. Other operations performed by routing protocol module 16 may include computing label-switched paths (LSPs), signaling LSPs using an LSP signaling protocol, managing routing instances, managing layer 2 and layer 3 virtual private networks, and managing multicast groups and computing multicast distribution trees for multicast traffic, for instance.

Routing protocol module 16 includes multiple software execution threads 26, 28, 32, and 40. Threads 26, 28, 32, and 40 may be scheduled by operating system 36 for execution by cores 56 according to a multi-threading scheduling scheme, e.g., using time-slicing, and routing protocol module 16 may represent an overall software process having the multiple software execution threads or, as an alternative, a single-threaded process.

As one example, thread 40 executes one or more protocols such as interior gateway protocol (IGP) 42 and resource reservation protocol (RSVP) 44. IGPs for IGP 42 may include open shortest path first (OSPF), intermediate system to intermediate system (IS-IS), and routing information protocol (RIP), for instance. Other protocols (not shown) that may be executed by thread 40 may include signaling and control protocols for L3VPN, L2VPN, Ethernet VPN, Multicast VPN, Virtual Private LAN Service, Protocol Independent Multicast, Label Distribution Protocol, for instance. In some examples, main thread 28 and thread 40 may be combined as a single thread, or multiple threads that perform similar operations for a common set of protocols.

Although techniques of this disclosure are described primarily with respect to the Border Gateway Protocol (BGP), the techniques are similarly applicable to processing routing information received in routing protocol messages according to other layer 3 routing protocols, as well as interior gateway protocols in which route resolution is required, such as any distance-vector protocol (e.g., RIP).

In the illustrated example of network device 12, BGP 18 generally refers to at least one routing protocol process effectuating BGP standards in a network of network device 12. Executing the at least one routing protocol process in MCCE 52 causes the at least one routing protocol process to process and distribute the above-mentioned routing information throughout the network of network device 12. BGP 18 supports exchange of at least two types of routing information where one type advertises complete routes to destinations and another type shares network reachability information. Multiprotocol BGP (MP-BGP) extensions enable BGP 18 routing protocol processes to support different protocols by storing, in attributes of BGP messages, information corresponding to a different protocol in addition to the routing information for BGP 18. As described herein, labeled routes may be stored in these attributes. Hence, the different (non-BGP) protocols piggyback route distribution in BGP 18 to distribute labels (e.g., MPLS labels, such as VPN route labels or other service labels). In some examples, routing protocol module 16 may implement MPLS VPNs, such as MPLS/BGP VPNs, BGP-LU services, and/or EVPNs.

Underlying BGP 18 is peer-to-peer model where only some network devices can be considered peers to the network device 12. BGP 18 routing protocol processes share routing information with these peers through communication sessions and/or exchanges of routing protocol messages. By parsing these messages and examining attributes stored therein, BGP 18 routing protocol processes may identify new routes and/or new neighbors/peers as possible destinations for data from network device 12. Network device 12 learns a route to a new destination or a new route to an existing destination, assigns a label to that route, and exchanges the labeled route with other peers (e.g., in a routing protocol message).

Some protocols assign and use labels for labeled routes advertised using BGP, e.g., MP-BGP. When BGP distributes a VPN route, it also distributes a service label for that route, which for BGP/MPLS VPNs is known as a VPN route label.

Before a data packet for a VPN travels across the backbone, it is encapsulated with the VPN route label that corresponds, in the VPN, to the route that is the best match to the packet's destination address. Route distribution and labeling is similar for other services, such as EVPN and BGP-LU. The labels (e.g., MPLS labels) are drawn from a label space (e.g., MPLS label space) of non-overlapping values, preventing conflicts between labeled routes.

If network device 12 is an edge router in a network having Layer 3 VPNs connecting customer networks, BGP 18 propagates routing information for VPN prefixes among other edge devices by means of the above-mentioned multiprotocol extensions, ensuring that the routes for a given VPN are learned only by other members of that VPN, enabling members of the VPN to communicate with each other. Some systems implement a concurrency model where operations are partitioned amongst a number of processes/sub-processes, each utilizing a separate execution path.

Routing protocol module 16 includes one or more Border Gateway Protocol (BGP) input-output (TO) thread(s) 32 that receives and outputs routing protocol messages for a routing protocol, BGP 18 in this example. BGP IO thread(s) 32 may manage a receipt queue of routing protocol messages received by network device 12 at IFC(s) 50 for processing by main thread 28 and route processing threads 26A-26N (collectively, "route processing threads 26"). BGP IO thread(s) 32 may manage an output queue of routing protocol messages generated by routing processing threads 26 and for output via IFC(s) 50. The number of threads 26, N, may be configurable by a user or operator of network device 12. Routing protocol module 16 may include additional one or more threads (not shown) for managing and/or exchanging routes with the kernel routing table (also not shown).

Routing protocol module 16 includes multiple, concurrently executing, route processing threads 26 for distributing and performing distributed processing of routes, received in routing protocol messages by network device 12. In general, a routing protocol message advertises one or more routes, each route made up of a destination network prefix and a next hop router (or more simply, "next hop") of the network for reaching the destination network prefix. For example, a BGP UPDATE message is an example of a routing protocol message and includes a NEXT_HOP path attribute that specifies a next hop for one or more destination network prefixes included in respective network layer reachability information (NRLI) of the BGP UPDATE message. The destination network prefix and the next hop may be expressed as addresses in the Internet Protocol (e.g., IPv4, IPv6) address space. A next hop is an example of forwarding information for a network prefix. As described elsewhere herein, a route may be advertised along with a label that, e.g., identifies a routing context (e.g., VRF) or identifies the advertised route for a packet that includes the label and is received by a network device that assigned the label to the route.

Route processing threads 26 may be substantially similar in that each of routing processing threads 26 separately executes similar operations for processing routing protocol messages received by network device 12. Examples of such operations are described in further detail with respect to FIG. 2. Operating system 36 may schedule two or more route processing threads 26 to execute at least partially concurrently on respective cores 56 such that multiple route processing threads 26 may execute at least partially in parallel to process respective routing protocol messages concurrently. In addition, although the techniques are described primarily with respect to a single multi-threaded process (i.e., routing protocol module 16), the techniques may be applied using multiple threads executing within different processes located on a single network device or distributed among multiple different network devices. For example, a BGP IO thread 32 may execute on a load balancing device to distribute received routes among multiple separate network devices each configured to execute one or more of routing processing threads 26 to process routes in the manner described herein.

Route processing threads 26 manage respective, separate partitions 24A-N of routing information in the form of routing information base (RIB) 22. RIB 22 is partitioned into RIB partitions 24A-N of which each stores a different portion of public routes that make up the overall RIB 22 for network device 12. In the illustrated example, RIB 22 further stores VPN routing information in VPN Routing and Forwarding tables (VRFs) 33. In one example, RIB 22 incudes routing tables storing the following routing information: 1) Routing information learned from update messages received from other network devices (e.g., BGP peers); 2) Local routing information that BGP 18 applies to routes because of local policies; and 3) Information that BGP 18 advertises to other network devices (e.g., BGP peers) in update messages.

In the example of FIG. 1, in which routing protocol module 16 processes BGP UPDATE messages, each of threads 26 and 28 execute at least a subset of the BGP routing protocol operations. For example, route processing threads 26 may process the BGP UPDATE messages, and route processing threads 26 and main thread 28 may cooperatively resolve next hops for routes received in the BGP UPDATE messages, as described in further detail below.

Network device 12 receives, via IFC(s) 50, routing protocol messages. As control plane messages, control plane 34A processes the routing protocol messages. In particular, routing protocol module 16 processes the routing protocol messages. For a routing protocol message received by network device 12, one of BGP IO thread(s) 32 initially processes the routing protocol message, which includes a route, to identify one of the route processing threads 26 with which to process the route. For example, a BGP IO thread 32 may apply a hash function to a network prefix for the route, where a number of hash buckets for the hash function is configured to be the number of route processing threads 26 and each hash bucket corresponds to the assigned route processing thread 26A for routes hashed to the hash bucket. The BGP IO thread 32 may apply the hash function to select bits of the network prefix in some cases, and in some cases BGP IO thread 32 may apply the hash function to other attributes of a received routing protocol message in addition or in the alternative to the network prefix. As another example, the BGP IO thread 32 may apply another operation to identify one of the route processing threads 26 with which to process the route, such as using bit patterns applied to bits of a network prefix, the masked values of which being mapped to the route processing threads 26. In such cases, BGP IO thread 32 stores a data structure that maps each result value for application of bit patterns to one of route processing threads 26.

The BGP IO thread 32 then signals the identified route processing thread 26A to process the route. For example, BGP IO thread 32 may add the route or the full routing protocol message to a queue of routing protocol module 16 and shared by the various route processing threads 26 but processed by the identified route processing thread 26A for the route. Network device 12 sends, via IFC(s) 50, routing protocol messages generated in control plane 34A by routing protocol module 16.

In accordance with techniques described herein, some of these routing protocol messages advertise labeled routes from RIB 22 to other network devices. Threads 26, 28 of network device 12 performs distributed label assignment for such labeled routes. Preparation of a labeled route includes assigning a label from the label space. To accomplish such label assignment, the threads 26, 28 implement a concurrency model in which the performance of the label assignment approaches that of a centralized label assignment. Routes may be configured or learned at network device 12 by main thread 28 and/or one or more of threads 26 of routing protocol module 16. Main thread 28 administers the label space to coordinate label assignment such that the same label is not assigned to different ones of threads 26.

In one example, labels are assigned among the processing threads 26 such that each thread 26 manages a local label pool (LLP) 30 that is a unique subset of the labels. That is, none of the labels in the local label pool 30 fora thread 26 overlaps with labels of a local label pool 30 managed by a different thread 26. Each thread 26 uses its local label pool 30 for label assignments, and labels released by a thread 26 are released to its local label pool 30. In addition, a thread 26 pre-fetches batches of labels from global label pool 31 to its local label pool 30 to avoid initial fetching latency and releases batches of labels to the global label pool 31 in accordance with thresholds (or "watermarks") to reduce, and in some cases minimize, inter-thread communications regarding label allocation and release. Each thread 26 may then assign labels from its local label pool 30 to include with routes for advertising, by the network device 12, labeled routes using a routing protocol, e.g., BGP. The global label pool 31 is centrally administered, by main thread 28, to allocate labels from the label space, e.g. the 20-bit MPLS label space, to local label pools 30 of threads 26, which assign labels from their respective local label pools 30 to labeled routes. To coordinate such label assignment from the global label pool 31, main thread 28 executes software code referred to herein as label manager 29.

The techniques may provide one or more technical improvements or benefits that provide at least one practical application. In general, slow label assignment can cause delays in generating and outputting route advertisements and attendant deleterious effects to network packet forwarding. Previous attempts to avoid label conflicts among multiple threads rely heavily upon exchanging messages with inter-thread/inter-process communications to avoid label conflicts, often in a request/response mode between worker threads and a central thread responsible for managing label allocation, which is performed on a per-label basis. Because inter-thread messages involve latencies and processor (e.g., CPU) costs, centrally-managed per-label allocation may become very expensive and cause significant performance penalties.

Threads 26 and 28 operating according to techniques described herein implement a concurrency model in which coordination among the threads is relatively infrequent and batchwise, and each thread 26 has a separate local label pool 30 from which to draw for low-latency label assignment. Moreover, the threads 26 can pre-fetch batches of labels according to the thresholds. This reduces inter-thread messaging and may cause the label assignment failure rate (i.e., a thread being unable to assign a label from its local label pool) to approach zero. The efficiencies may reduce the average overall latency for labeled route generation and advertising by network devices and may result in attendant improvements in network packet forwarding.

Once a route to a destination device is learned by one of threads 26, a label is assigned from its local label pool 30 to the learned route to generate a labeled route, and BGP 18 assembles the labeled route into a routing protocol message for advertisement and output via IFC 50. The route may be a direct route to the destination without a next hop or an indirect route to the destination with one or more next hops. To determine the route, BGP 18 may modify an existing route to the destination to include network device 12 or another network device as a next hop. Because the determined route is new and unlabeled, threads 26 for BGP 18 assign an unused or free label to the determined route.

In some examples, main thread 28 may allocate a distinct set of labels from the global label pool 31 to thread 26A to manage and use for label assignment. Thread 26A adds the distinct set of labels to a local label pool 30A only accessible to thread 26A. After assigning labels to routes until a remaining size of the local label pool 30 meets a threshold, thread 26A requests additional labels. When one or more labels are allocated to this thread, thread 26A adds the one or more labels to the local label pool. When a new route is to be processed by thread 26A, thread 26A assigns to the new route a label from its LLP 30A, generating a labeled route. Hence, the labeled route includes the new route and the label. That thread 26A proceeds to advertise the labeled route by distributing routing protocol messages comprising the labeled route.

The following describes an example technique for labeled route generation and distribution by threads 26 for a network service (e.g., VPN). Routing module 16 incorporates the example technique into instructions for threads 26. A route for the network service may be a route from network device 12 to a destination. The destination may be network device in a different network than the network of network device 12. The different network may be a customer network belonging to a customer of the network provider that provides the network service using network device 12. To access devices and services hosted in the customer network, the destination routes messages directed to these devices and returns responses from these devices.

The network service may utilize a specific label space initially in global label pool 31 where each label is configured for that network service. Label Manager 29 of main thread 28 may allocate a different local label pool 30 of the network label space to each thread of threads 26 for labeled route generation. In this example, a given label of the label space is available for assignment to individual routes for the network service and/or to this entire network service (e.g., the network service address prefix). If the latter case, the specific label space may include a single label for the network service.

In an example where network device 12 receives a BGP OPEN message establishing a BGP adjacency with a router in a new network service (e.g., VPN), BGP 18 may record a portion of the BGP OPEN message as routing information in RIB 22 where that routing information identifies the new network service and at least one network device for the new network service. The at least one network device is now a peer to network device 12. Via BGP 18, network device 12 and the new network service may engage in a BGP session to exchange routes. In an example where network device 12 receives the BGP UPDATE message advertising feasible routes and/or withdrawing previously advertised routes, the network device 12 records the advertised routes and removes the withdrawn routes. The network device 12 proceeds to resolves new routes from the peers based upon updated routing information and, by way of the techniques described herein, assigns labels to these new routes.

Figure 2:
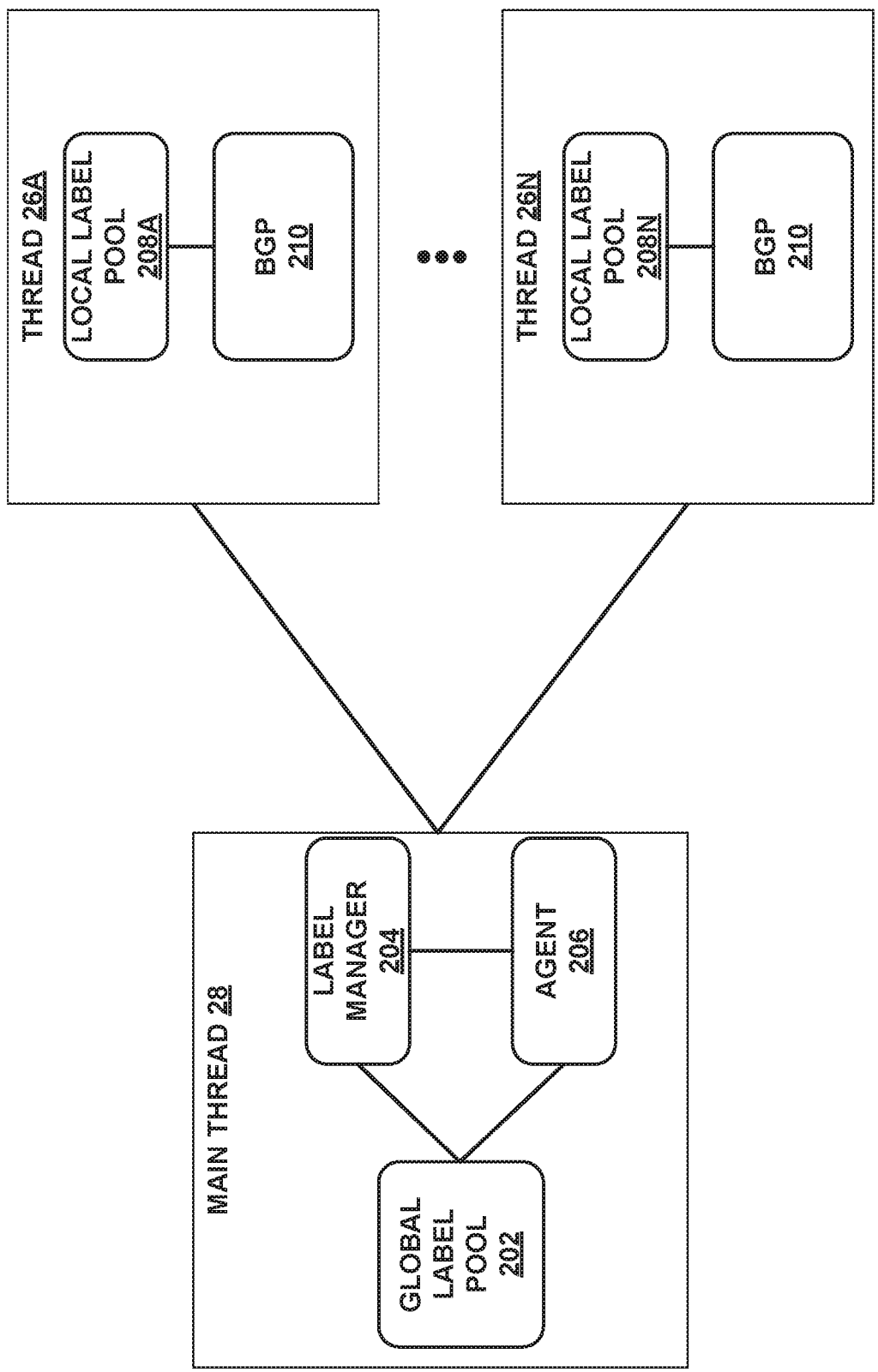
FIG. 2 is a block diagram illustrating example threads, in accordance with the techniques described in the present disclosure.

FIG. 2 is a block diagram illustrating example threads, in accordance with the techniques described in the present disclosure. Example threads are execution threads for a routing protocol process (e.g., a BGP process). One example thread, main thread 28 of FIG. 1, controls other example threads, such as threads 26A-26N of FIG. 1. Main thread 28 accesses memory storing global label pool 202 and retrieves one or more unique labels for allocation amongst threads 26A-26N such that each thread 26 manages a non-overlapping subset of labels of the label space. Main thread 28 accesses instructions for label manager 204 and agent 206 for label manager 204 and, by executing these instructions, performs various functionality for label manager 204 and agent 206.

Label manager 204, in general, maintains global label pool 202 for the routing protocol process via agent 206 by responding to requests for additional label allocations from threads 26 and handling releases of excessive labels. Global label pool 202 may represent an example instance of global label pool 31 of FIG. 1. Each label allocation or label release causes a modification to a particular local label pool, resulting in a modified local label pool. Each of threads 26 uses a system of watermarks to control a size of each local label pool 208 and to maintain an optimal load and peak performance. When a number of labels available to one of threads 26 falls below a low watermark or exceeds a high watermark, that thread 26 may request a label allocation or submit a label release (e.g., in an inter-thread communication) from label manager 204 via thread 206. By redistributing labels from one thread to another thread, label manager 204, for example, improves the routing protocol process with load balancing. Agent 206, accordingly, is configured to coordinate label allocations amongst threads 26 as directed by label manager 204.

Label manager 204 partitions the label space into non-overlapping portions for distribution amongst threads 26. Each of threads 26 maintains, in a separate local label pool, a respective non-overlapping portion where each label is unique and currently unassigned to a route. To illustrated by way of example, thread 26A and thread 26N maintain local label pool 208A and local label pool 208N where labels in local label pool 208A are distinct from labels in local label pool 208N.

Each of threads 26 manages a portion of total routing information maintained at a network device, such as network device 12 of FIG. 1. For instance, thread 26A maintains local label pool 208A as a source of labels for potential assignment to and advertisement of routes. These routes may be determined by thread 26A from any type of routing information or forwarding information described for FIG. 1 including partition 24A of RIB 22 and/or VRFs 33. While a label that is assigned to a route is removed for consideration in future label assignments at thread 26A, that assigned label is still part of the label space and the allocated portion of that space to thread 26A. When the label is no longer bound to a valid route, the label is freed and released back into local label pool 208A. In some instances, returning the freed/released label may cause the local label pool 208A to meet or exceed a watermark established by label manager 204, necessitating a release of a batch of labels back to global label pool 202. Thread 26A communicates this batch of labels to main thread 28 via agent 206 in a label release message. In turn, label manager 204 may instruct agent 206 to allocate the label to thread 26N or any other thread of threads 26 requesting a batched allocation of labels. Threads 26, 28 may communicate label requests and label releases using any form of inter-process or inter-thread communication, e.g., shared memory, message queues, inter-thread function invocation, and so forth.

Network device 12 peers with BGP peers to receive routes for network services, such as a VPN service, a BGP-LU service, or an EVPN service. In some cases, network device 12 advertises itself as a next hop for a received route. In some cases, network device 12 advertises itself as a next hop for a route configured in and originated by network device 12. In any event, in some cases the route to be advertised is to be assigned a label from the label space for the network service for the route. Accordingly, thread 26A assigns a label from local label pool 208A to the route.

In some cases, the assigned label maps to an interface (e.g., an attachment circuit) for the new network service and may therefore represent each and every communication path from network device 12 to devices reachable via the route. As an alternative or as an option, thread 26A may also assign a label from local label pool 208A to each route for the network service. In such cases, the network device may only be able to determine a packet's destination needs to be lookup up in a particular VRF before being forwarded. Thread 26A outputs each labeled route in BGP UPDATE messages. Via network device 12, thread 26A and peer devices engage in routing protocols sessions to exchange routes. For example, network device 12 may receive routes from customer edge devices via routing protocol sessions. Based upon these sessions, thread 26A may determine new routes and remove any invalid or withdrawn routes.

To perform label distribution for a network service known as a VPN, thread 26A of network device 12 (e.g., a provider edge (PE) device) assigns MPLS labels (e.g., VPN route labels) from the thread 26A's local label pool 208A to private routes before advertising private routes to other PE devices (via Multiprotocol BGP). In this example, VRFs 33 store prefixes for the VPN instance. BGP 210 may be an example of BGP 18 of FIG. 1 and be configured with peering information between network device 12 and other PE devices. Thread 26A may distribute MPLS labels in one of the following ways: one label per route, one label per VPN instance, or one label per next-hop. Hence, each route in VPN instance's VRFs is assigned one label from the local label pool or each VPN instance is assigned one label from the local label pool such that all the routes of a VPN instance share the same label, reducing the number of labels required.

Figure 3:
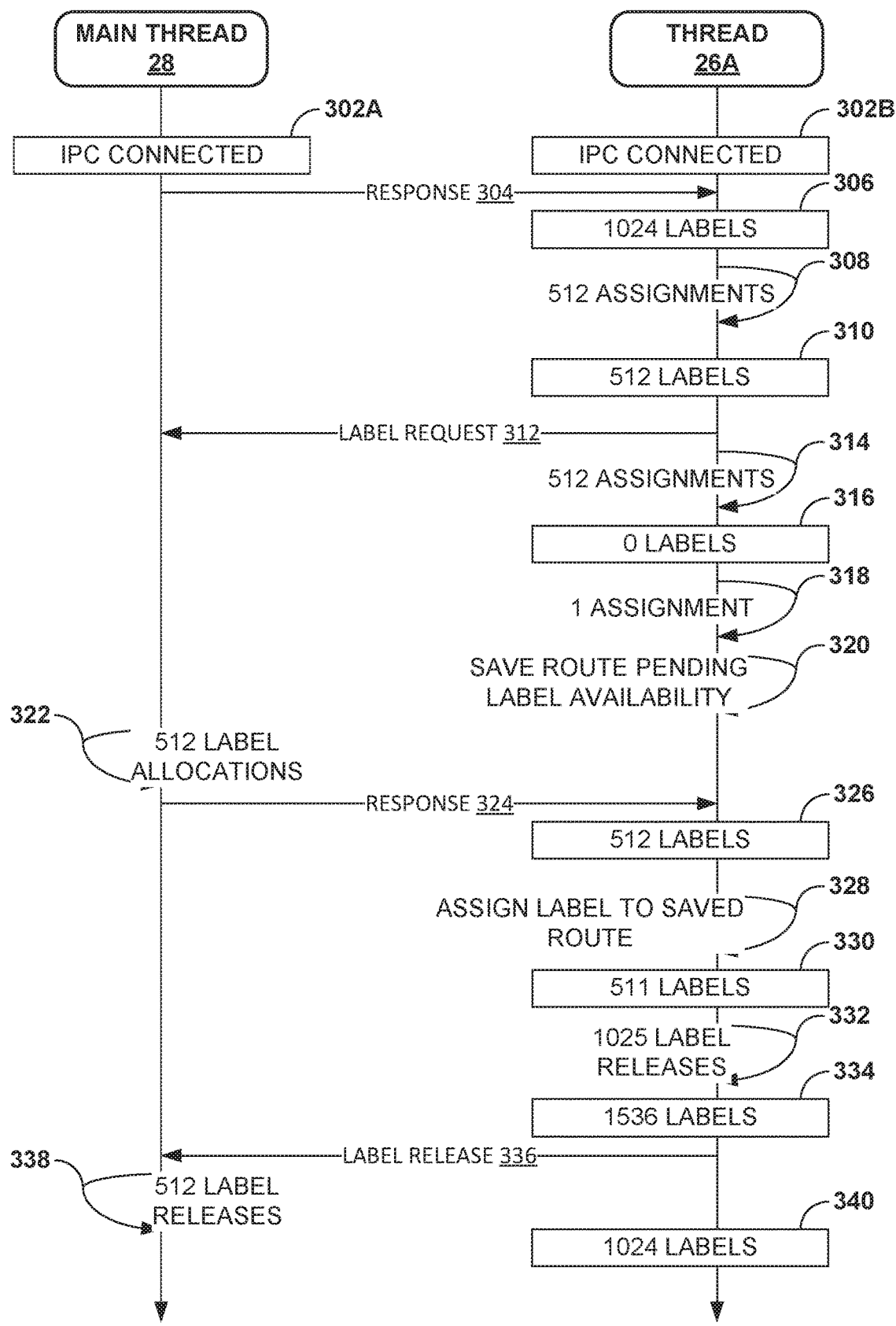
FIG. 3 is a flowchart illustrating example operations for label allocation and release, in accordance with the techniques described in the present disclosure.

FIG. 3 is a flowchart illustrating example operations for label allocation and release, in accordance with the techniques described in the present disclosure. As described herein, main thread 28 administers a global label pool (e.g., global label pool 202 of FIG. 2) representing labels forming a label space and thread 26A maintains a subset of these labels in a local label pool (e.g., local label pool 206 of FIG. 2) as a source of labels for assignment to a portion of BGP routing information at network device 12 of FIG. 1.

More or less at a same time-step, main thread 28 becomes IPC connected (302A) and thread 26A becomes IPC connected (302B) to enable inter-process communications (IPCs) or inter-thread communications between main thread 28 and thread 26A. Main thread 28, in response 304, provides thread 26A with a first allocation of labels (e.g., 1024 labels), which are stored by thread 26A in local label pool 30A (306). At this time-step, there are 1024 labels available for assignment to new unlabeled routes. At some future time-step, thread 26A performs 512 assignments, e.g., 512 instances in which a label is assigned from the local label pool 30A to a route, generating a labeled route (308). At this time-step, the local label pool includes 512 labels for future assignment to new routes (310).

Having determined that a size (in number) of the local label pool at thread 26A meets a threshold number of labels (e.g., a watermark), thread 26A communicates request 312 to main thread 28. Request 312 is an IPC configured to prompt agent 206 of a label manager 204 to allocate additional labels from the global label pool 31. After communicating request 312, thread 26A proceeds with label assignment, performing 512 assignments of labels to routes (314). At this time-step, the local label pool includes zero labels for future assignments to new (or otherwise unlabeled) routes (316). Because having zero labels precludes another label assignment, thread 26A saves new routes until a next allocation of labels. Hence, if a new route is determined, an assignment from the local label pool is attempted but cannot be completed (318). Thread 26A saves the new route pending label availability (320) At the next time-step, main thread 28 performs 512 allocations of labels from the global label pool and communicates response 324 as a second allocation of labels to the local label pool (322) Thread 26A receives response 324 and stores the second allocation of labels into the local label pool, resulting in 512 available labels in the local label pool (326). Label allocations of multiple labels from main thread 28 to thread 26A may be batched, i.e., assigning a contiguous range of labels from global label pool 31; may be serially allocated one at a time in one or more response communications; or some combination of the above.

Because of the saved route, thread 26A assigns a label from the local label pool to the saved route (328). At a next time-step, thread 26A has 511 labels in the local label pool (330). In response to routing protocol messages withdrawing previously labeled routes, thread 26A may designate up to 1025 previously assigned labels as free and available for assignment to a new route (332). In this manner, 1025 previously assigned labels are returned to the local label pool, resulting in 1536 labels that are available for assignment by thread 26A (334). Having determined that the local label pool meets a threshold (e.g., a watermark), thread 26A releases 512 labels in release 336. In turn, main thread 28 performs 512 label release operations to return these labels to the global label pool. These 512 labels are removed from the local label pool 30A, which leaves 1024 available labels (340).

Figure 4:
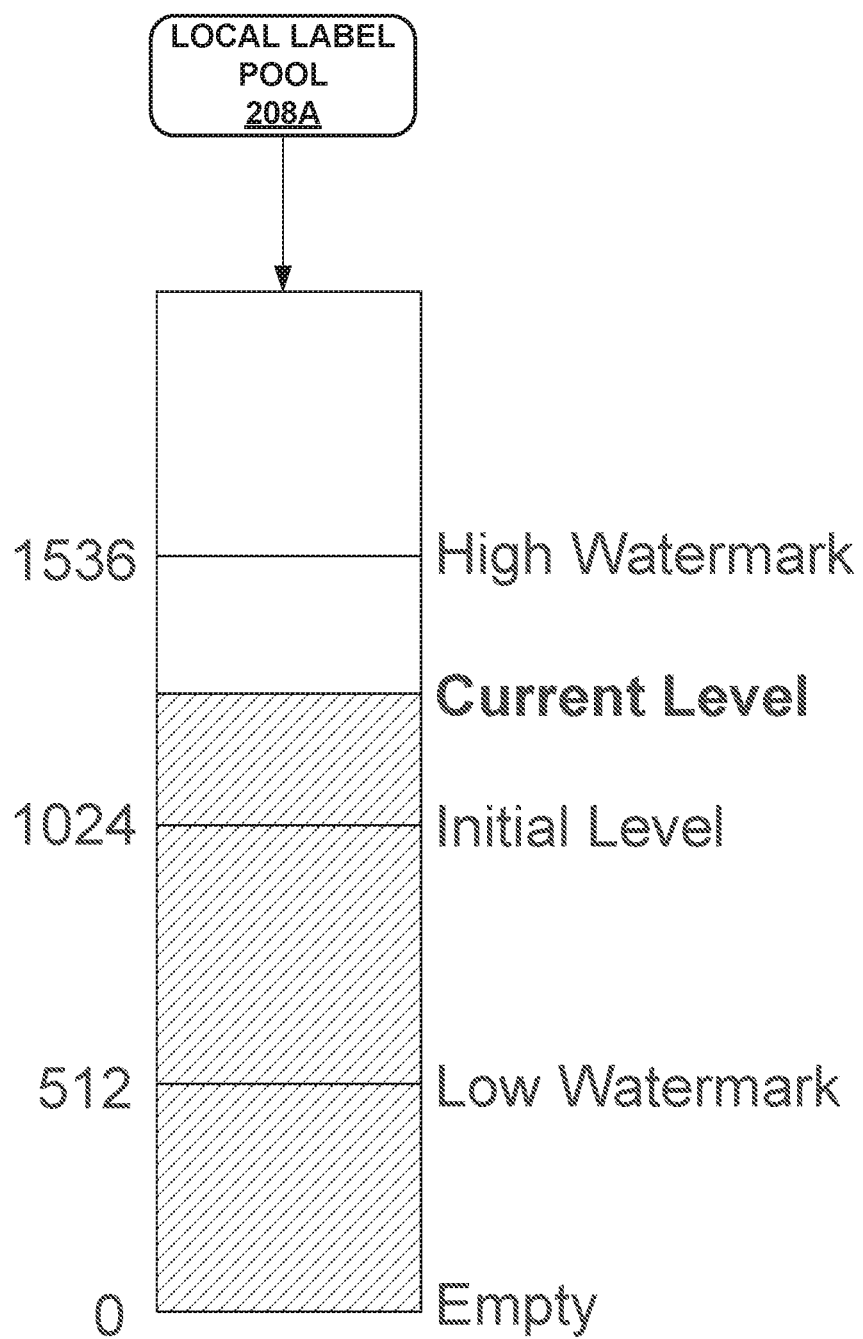
FIG. 4 is a block diagram illustrating an example local label pool and watermarks for an example network device in a network, in accordance with the techniques described in the present disclosure.

FIG. 4 is a block diagram illustrating an example local label pool and watermarks for an example network device in a network, in accordance with the techniques described in the present disclosure. The example local label pool may be used by at least one thread of a plurality of execution threads for a routing protocol process executing on processing circuitry within that example network device.

As illustrated and described herein, the example network device uses thresholds (e.g., watermarks) to manage a set of unique labels in local label pools, including their assignment to routes. One example purpose of such thresholds is for load-balancing label assignment by an execution thread for the routing protocol process. Starting with an initial level of labels, the execution thread maintains a manageable number of labels as their portion of a label space.

The example network device represents network device 12 of FIG. 1 and includes local label pool 208A, which may represent an example instance of local label pool 30A. In some examples, local label pool 208A corresponds to thread 26A and, as illustrated in FIG. 3, receives batched allocations of labels from main thread 28. Each batched label allocation from main thread may cause a modification to local label pool 208A, resulting in modified local label pool 208A. When a route is assigned a label to generate a labeled route, that label is removed from local label pool 208A, resulting in reduced local label pool 208A. When a labeled route is withdrawn, that label is freed and returned to local label pool 208A. In other examples, thread 26A requests a label release to remove labels from local label pool 208A and return the labels back to main thread 28 global label pool 31.

Thread 26A manages a size (in number) of local label pool 208A by requesting and adding labels to local label pool 208A from global label pool 31 or releasing labels from local label pool 208A global label pool 31 based upon established thresholds. Each label addition or release modifies local label pool 208A. If a size of local label pool 208A meets or exceeds the high watermark (1536 labels in this example), thread 26A communicates a label release directive to reduce the size of local label pool 208A by an amount that local label pool 208 no longer exceeds the established threshold. If a size of local label pool 208A meets or falls below a low watermark, thread 26A communicates a label request directive to main thread 28 to request additional labels from global label pool 31.

Figure 5:
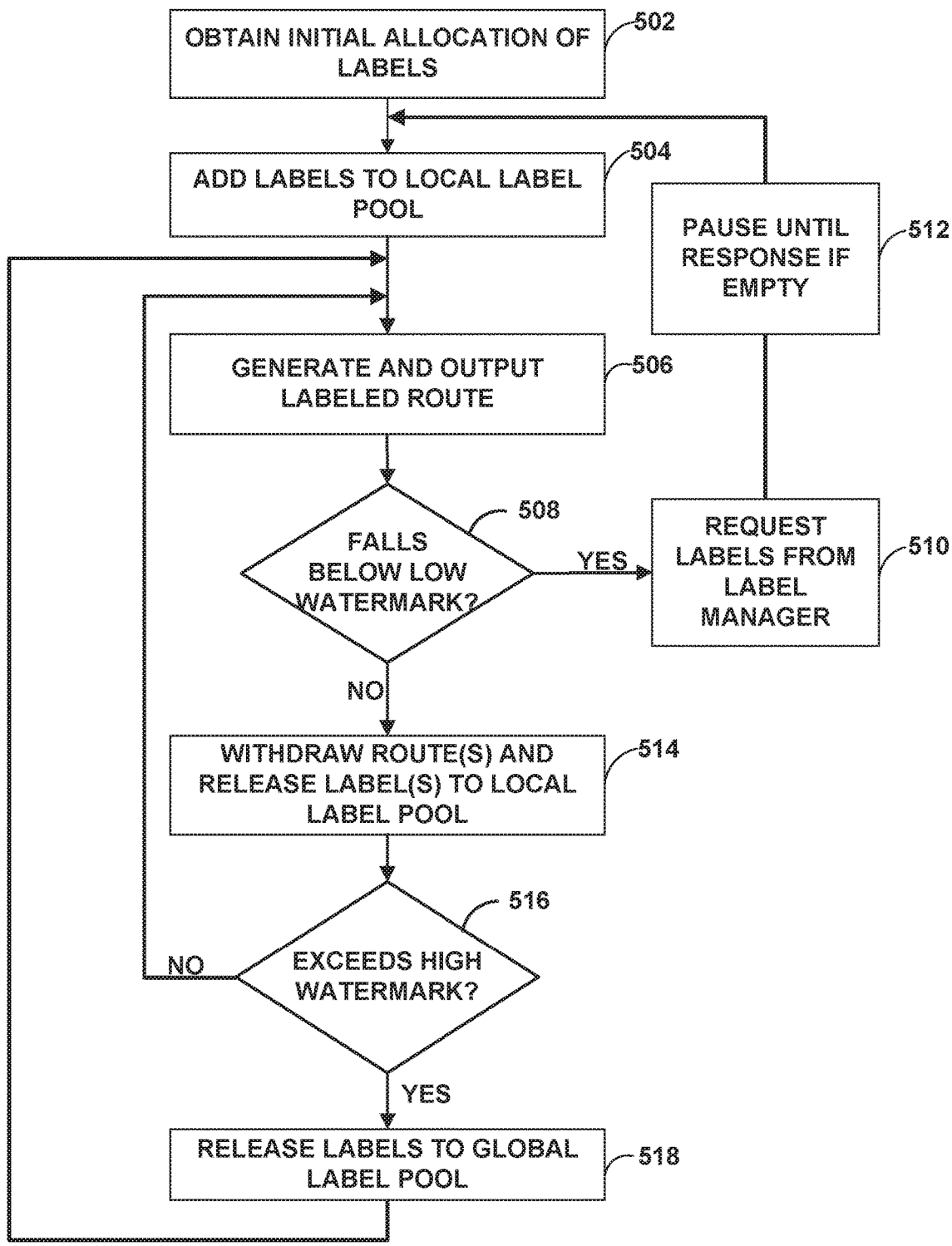
FIG. 5 is a flowchart illustrating example operations for managing the example local label pool of FIG. 4, in accordance with the techniques described in the present disclosure.

FIG. 5 is a flowchart illustrating example operations for managing an example local label pool, in accordance with the techniques described in the present disclosure. In a network device such as network device 12 of FIG. 1, a first thread of a plurality of execution threads for a routing protocol is configured to commence route processing and label distribution with respect to the example local label pool. The first thread manages the example local label pool, for example, by controlling a total number of labels in the first thread's share of the label space. This may be done for load-balancing; by holding the size of the local label pool within an optimal range a range defined by low and high watermarks, the threads may ensure local availability of low-latency label assignment while facilitating appropriate balancing and global availability of labels to all threads according to need. If the local label pool is reduced and at risk of falling out of the optimal range, a main thread of the plurality of execution threads for a routing protocol either provides the first thread with additional labels from a global label pool or accepts labels from the local label pool, as appropriate. A second thread of the plurality of execution threads for the routing protocol may be allocated from the global label pool labels that were previously in the local label pool of the first thread. In this manner, the main thread ensures an efficient processing time for labeled route generation even when the first thread is at full capacity or overloaded. The first thread also manages at least a portion (if not all) routing information compiled for the routing protocol process, for example, by identifying new routes (e.g., BGP routes and non-BGP routes) for label assignment. When a labeled route is later withdrawn as a valid route from the routing information, that route's assigned label may be released back into the local label pool for reuse by the first thread.

For convenience, FIG. 5 is described with respect to FIGS. 2, 3, and 4. The present disclosure includes thread 26A as an example of the first thread; and as illustrated in and described for FIGS. 2, 3, and 4, processing circuitry executes thread 26A to commence route processing and label distribution with respect to local label pool 208A by (first) obtaining an initial allocation of labels (502). Main thread 28, as exemplified in response 304 of FIG. 3, provides an initial allocation of 1024 labels. The processing circuitry executing thread 26A proceeds to add the initial allocation of 1024 labels to local label pool 208A (504). At this point in time, a size of the local label pool 208A corresponds to the initial level of 1024 labels as visually depicted in FIG. 4.

As labels from the initial allocation are added to local label pool 208A, the processing circuitry executing thread 26A is able to commence generating and outputting labeled routes as described herein (506). In one example, the processing circuitry executing thread 26A processes routing information and identify routes to bind with labels. When a new route is determined, the processing circuitry executing thread 26A generates a labeled route by binding a unique label to the route and then, outputs the labeled route in the form of a routing protocol message. In some examples, the unique label and the route are stored in attributes of the routing protocol message. Each label assignment removes a label from the local label pool 208A.

As described herein, when a new destination for sending data from network device 12 is identified, the processing circuitry executing thread 26A has a new route for label assignment. The processing circuitry executing thread 26A assigns from the local label pool a label to the new route. The processing circuitry executing thread 26A stores the new labeled route in local routing information and generates routing protocol messages distributing the new labeled route. When the new destination is identified and that destination implements a VPN, there is a new private route to the destination's network from the network device 12 as well as a new public route where both routes are assigned non-overlapping unique labels by thread 26A and stored in local routing information. When an existing route (e.g., a BGP route) to a known destination (e.g., an exterior network device operating as a BGP internal or external peer) is stored in the local routing information, thread 26A may modify the route to create a new route by adding network device 12 as a next hop (e.g., a BGP next hop). The processing circuitry executing thread 26A assigns a new label to the modified route and distributes the modified route to other network devices (e.g., other BGP peers). In addition or as an alternative, the processing circuitry executing thread 26A identifies next hops (e.g., non-BGP next hops) in a network of the network device 12 and adds each next hop to the existing route, creating the new route (e.g., a non-BGP route). In some instances, the processing circuitry executing thread 26A employs another protocol (e.g., an internal gateway protocol (IGP)) to learn forwarding information indicating next hops amongst interior network devices.

As described herein, thread 26A manages local label pool 208A, for instance, by using pre-determined thresholds to constrain a size of local label pool 208A to a specific range. Low and high watermarks may be configurable as examples of pre-determined thresholds. As the processing circuitry executing thread 26A generates and outputs labeled routes (506), there are fewer available labels in reduced local label pool 208A. The processing circuitry executing thread 26A determines whether reduced local label pool 208A falls below a threshold of the low watermark (508). If the processing circuitry executing thread 26A determines that reduced local label pool 208A falls below the low watermark (YES branch of 508), the processing circuitry executing thread 26A proceeds to issue a label request in the form of an inter-thread communication to label manager 204 of main thread 28 (510). Main thread 28, in response to the label request, issues an inter-thread communication comprising a second allocation of labels. As long as local label pool 208A has available labels for assignment, the processing circuitry executing thread 26A is able to add labels to local label pool 208A from the second allocation of labels (504) while generating and outputting labeled routes (506). Therefore, the processing circuitry executing thread 26A proceeds with label assignment while waiting for the inter-thread communication from label manager 204 of main thread 28. If local label pool 208A becomes empty of available labels before the inter-thread communication arrives, the processing circuitry executing thread 26A pauses route processing and labeled route generation until the response is received (512). When the response is received, the processing circuitry executing thread 26A adds the labels to modified local label pool 208A (504) and resumes route processing and labeled route generation (506).

If, on the other hand, the processing circuitry executing thread 26A determines that local label pool 208A does not falls below the low watermark (NO branch of 508), the processing circuitry executing thread 26A proceeds with route processing and labeled route generation during which the processing circuitry executing thread 26A. In addition, the processing circuitry executing thread 26A may withdraw route(s) and release labels to modified local label pool 208A (514).

The processing circuitry executing thread 26A determines whether modified local label pool 208A exceeds a threshold of the high watermark (516). If the processing circuitry executing thread 26A determines that modified local label pool 208A exceeds the high watermark (YES branch of 516), the processing circuitry executing thread 26A invokes a number of function calls to release a sufficient number of labels to global label pool 202 such that local label pool 208A no longer exceeds the high watermark (518). If, on the other hand, the processing circuitry executing thread 26A determines that local label pool 208A does not exceed the high watermark (NO branch of 516), the processing circuitry executing thread 26A proceeds in route processing and labeled route generation (506).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instruc-

What is claimed is:

1. A method comprising:
   obtaining, by a first thread of a plurality of execution threads for at least one routing protocol process executing on processing circuitry of a network device, an allocation of first labels drawn from a label space for a network service according to a threshold established by a main thread of the plurality of execution threads as a minimum for a first local label pool for the first thread, wherein the main thread establishes the threshold for load-balancing label assignment by the plurality of execution threads for the at least one routing protocol process;
   adding, by the first thread, the first labels to the first local label pool for the first thread;
   generating, by the first thread, after obtaining the allocation of the first labels, a labeled route comprising a route for the network service and a label assigned by the first thread from the first local label pool; and
   outputting, by the network device, the labeled route.

2. The method of claim 1, further comprising:
   obtaining, by a second thread of the plurality of execution threads, an allocation of second labels drawn from the label space for the network service; and
   adding, by the second thread, the second labels to a second local label pool for the second thread,
   wherein the first labels and the second labels are distinct.

3. The method of claim 1, further comprising:
   allocating, by the main thread of the plurality of execution threads that manages the label space for the network service, the first labels to the first thread.

4. The method of claim 1, further comprising:
   removing, by the first thread, the label from the first local label pool to obtain a reduced first local label pool;
   generating, by the first thread, after obtaining the reduced first local label pool, another labeled route comprising another route for the network service and another label assigned by the first thread from the reduced first local label pool; and
   outputting, by the network device, the another labeled route.

5. The method of claim 1, further comprising:
   allocating, by the main thread of the plurality of execution threads that manages the label space for the network service, a set of new labels to the first local label pool to obtain a modified first local label pool for the first thread;
   generating, by the first thread, after obtaining the modified first local label pool, another labeled route comprising another route for the network service and another label assigned by the first thread from the modified first local label pool; and
   outputting, by the network device, the another labeled route.

6. The method of claim 5, further comprising:
   requesting, by the first thread, the set of new labels from the main thread, wherein the allocating is responsive to the requesting.

7. The method of claim 6, wherein the requesting comprises requesting, by the first thread in response to determining a size of the first local label pool meets or is below the threshold, an allocation of new labels.

8. The method of claim 1, further comprising:
   releasing, by the first thread, a portion of the first local label pool to the main thread of the plurality of execution threads that manages the label space for the network service.

9. The method of claim 8, wherein the releasing comprises releasing, by the first thread in response to determining a size of the first local label pool meets or exceeds another threshold, the portion of the first local label pool.

10. The method of claim 1, further comprising:
    obtaining, by the network device, the route for the network service;
    saving, by the first thread in response to determining the first local label pool has no available labels for assignment, the route to storage; and
    requesting, by the first thread, the allocation of first labels,
    wherein the generating comprises generating, by the first thread, the labeled route in response to receiving the allocation of first labels and obtaining the route from storage.

11. The method of claim 1, further comprising:
    receiving, by the network device, a packet comprising the label;
    identifying, by the network device based on the label, forwarding information generated from the route for the network service; and
    forwarding the packet according to the forwarding information generated from the route.

12. The method of claim 1, further comprising:
    storing the route for the network service to a virtual routing and forwarding instance (VRF) for the network service.

13. The method of claim 1, wherein the network service comprises one of a Multiprotocol Label Switching-based Virtual Private Network service, a Border Gateway Protocol Labeled Unicast service, or an Ethernet Virtual Private Network service.

14. A network device comprising:
    at least one hardware-based processor for executing a first thread of a plurality of execution threads for at least one routing protocol process executing on processing circuitry of the network device, the at least one hardware-based processor configured to:
    obtain, by the first thread of a plurality of execution threads for at least one routing protocol process executing on processing circuitry of the network device, an allocation of first labels drawn from a label space for a network service according to a threshold established by a main thread of the plurality of execution threads as a minimum for a first local label pool for the first thread, wherein the main thread establishes the threshold for load-balancing label assignment by the plurality of execution threads for the at least one routing protocol process;
    add, by the first thread, the first labels to the first local label pool for the first thread;
    generate, by the first thread, after obtaining the allocation of the first labels, a labeled route comprising a route for the network service and a label assigned by the first thread from the first local label pool; and output, by the network device, the labeled route.

15. The network device of claim 14, the at least one hardware-based processor configured to:
obtain, by a second thread of the plurality of execution threads, an allocation of second labels drawn from the label space for the network service; and
add, by the second thread, the second labels to a second local label pool for the second thread,
wherein the first labels and the second labels are distinct.

16. The network device of claim 14, the at least one hardware-based processor configured to:
allocate, by the main thread of the plurality of execution threads that manages the label space for the network service, the first labels to the first thread.

17. The network device of claim 14, the at least one hardware-based processor configured to:
remove, by the first thread, the label from the first local label pool to obtain a reduced first local label pool;
generate, by the first thread, after obtaining the reduced first local label pool, another labeled route comprising another route for the network service and another label assigned by the first thread from the reduced first local label pool; and
output, by the network device, the another labeled route.

18. The network device of claim 14, the at least one hardware-based processor configured to:
allocate, by the main thread of the plurality of execution threads that manages the label space for the network service, a set of new labels to the first local label pool to obtain a modified first local label pool for the first thread;
generate, by the first thread, after obtaining the modified first local label pool, another labeled route comprising another route for the network service and another label assigned by the first thread from the modified first local label pool; and
output, by the network device, the another labeled route.

19. The network device of claim 18, the at least one hardware-based processor configured to:
request, by the first thread, the set of new labels from the main thread, wherein the allocating is responsive to the requesting.

20. A non-transitory computer-readable medium comprising instructions for causing processing circuitry of a network device to:
obtain, by a first thread of a plurality of execution threads for at least one routing protocol process executing on the processing circuitry of the network device, an allocation of first labels drawn from a label space for a network service according to a threshold established by a main thread of the plurality of execution threads as a minimum for a first local label pool for the first thread, wherein the main thread establishes the threshold for load-balancing label assignment by the plurality of execution threads for the at least one routing protocol process;
add, by the first thread, the first labels to the first local label pool for the first thread;
generate, by the first thread, after obtaining the allocation of the first labels, a labeled route comprising a route for the network service and a label assigned by the first thread from the first local label pool; and
output, by the network device, the labeled route.

* * * * *